June 3, 1969  W. A. PFAFF  3,447,872
ULTRAVIOLET EXPOSURE DUPLICATING MACHINE FOR MICROFILM
Filed May 26, 1966
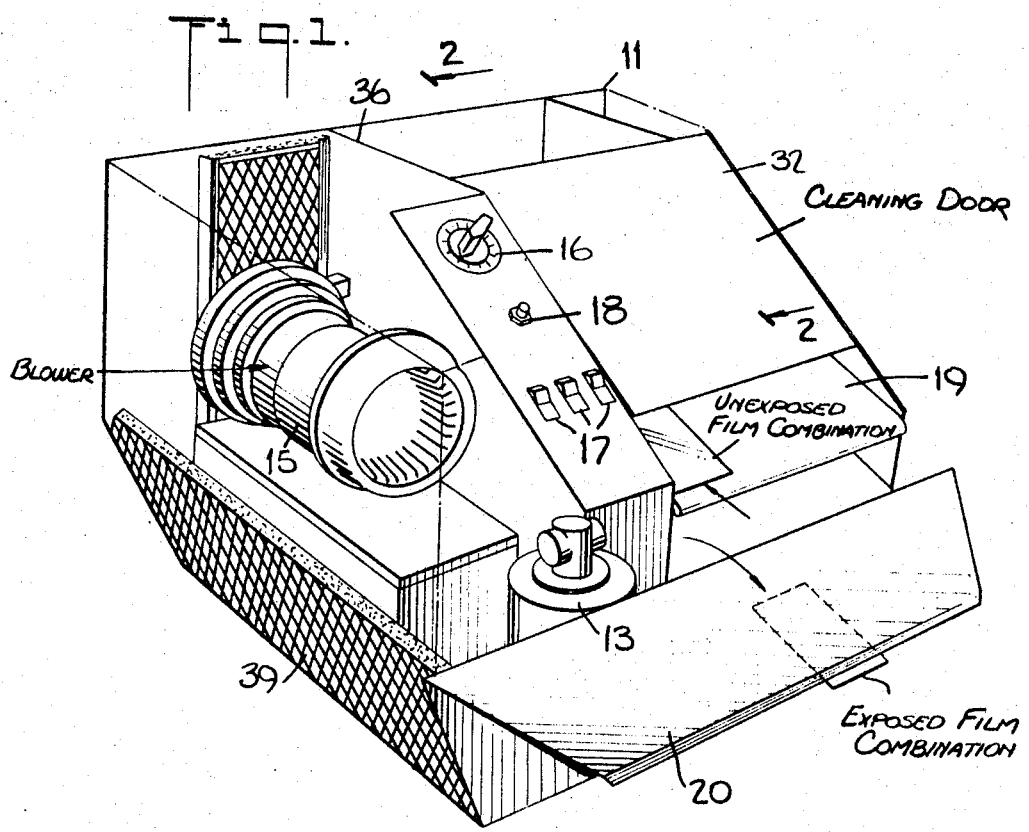
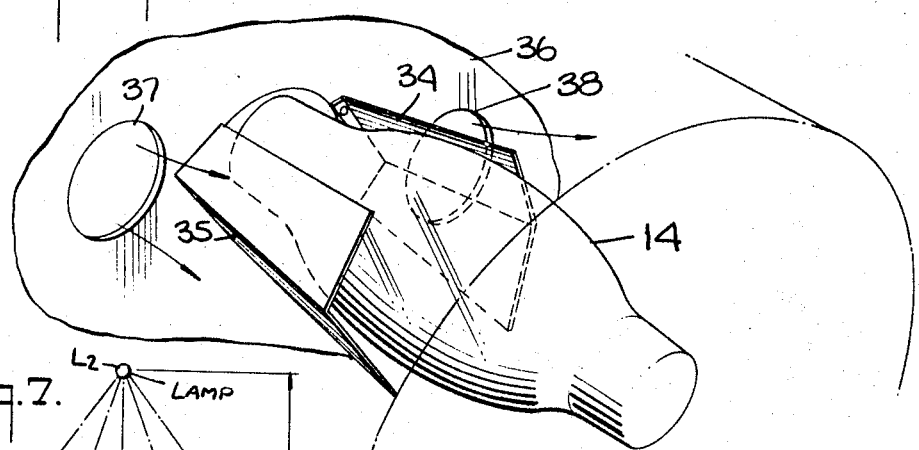
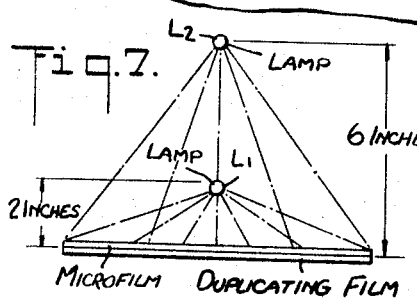
INVENTOR.
WILLIAM A. PFAFF
BY
ATTORNEY

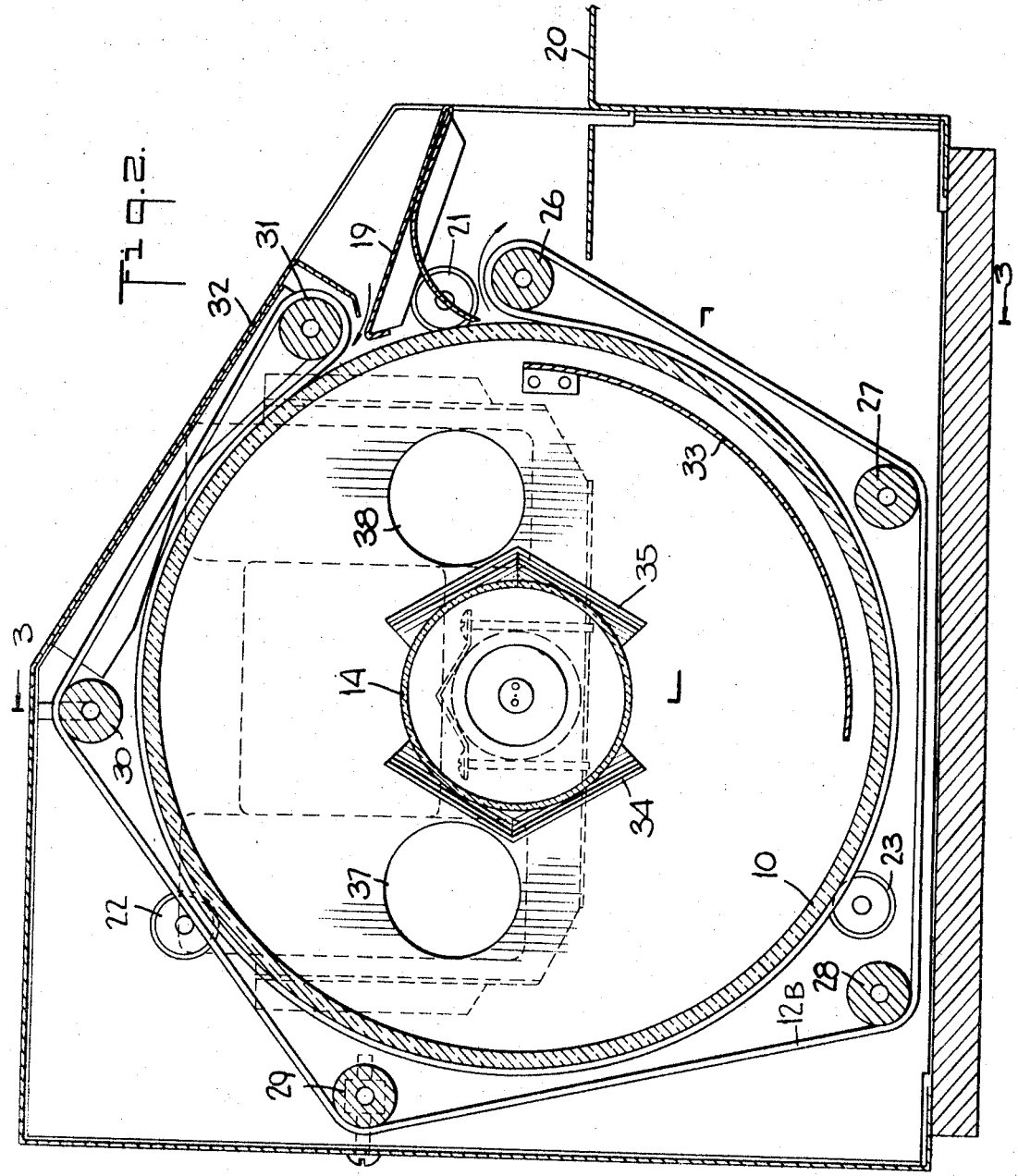

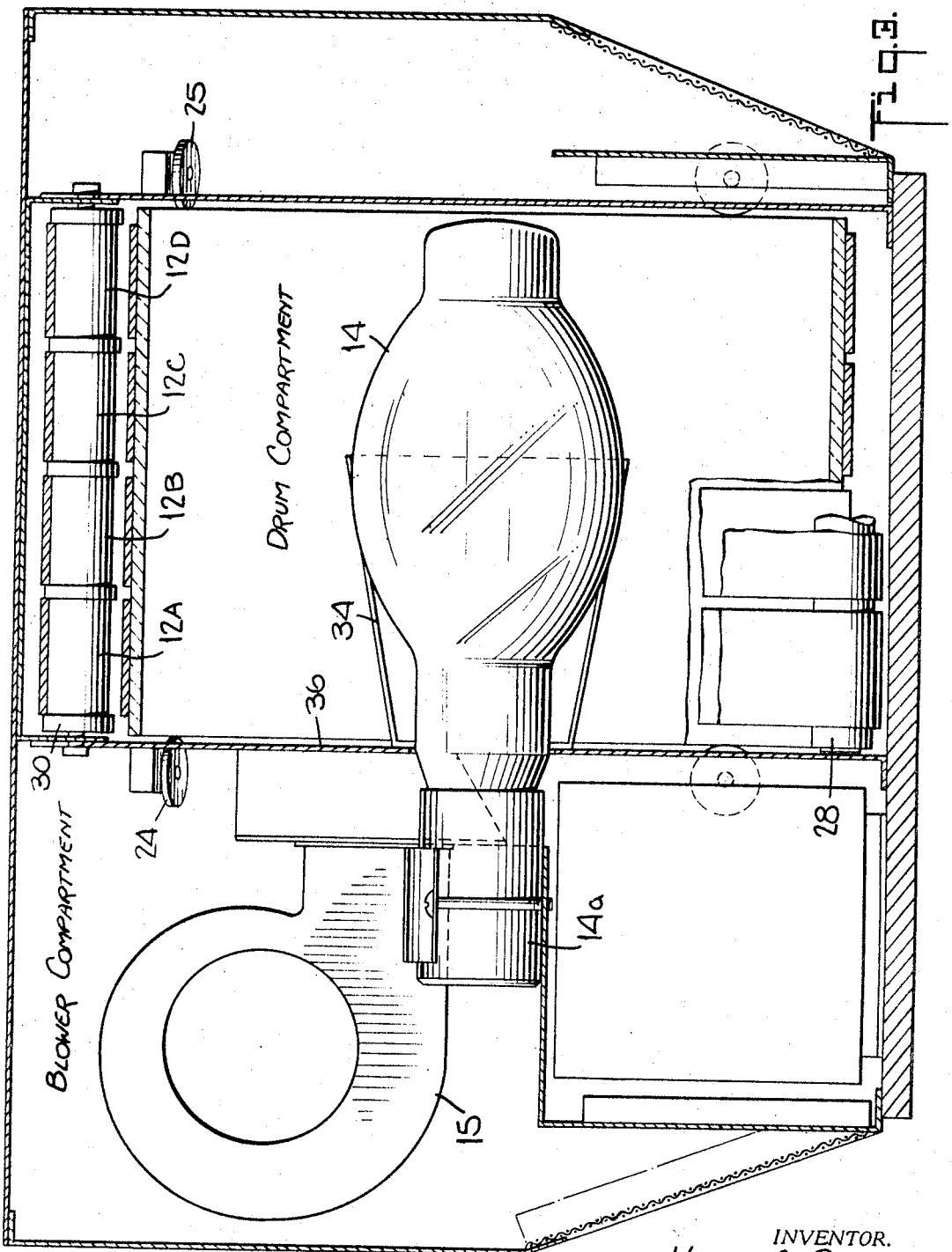

INVENTOR.
WILLIAM A. PFAFF

United States Patent Office 3,447,872
Patented June 3, 1969

3,447,872
ULTRAVIOLET EXPOSURE DUPLICATING MACHINE FOR MICROFILM
William A. Pfaff, Centerport, N.Y., assignor to NB Jackets Corporation, Long Island City, N.Y., a corporation of New York
Filed May 26, 1966, Ser. No. 553,153
Int. Cl. G03b 27/10
U.S. Cl. 355—110
8 Claims

ABSTRACT OF THE DISCLOSURE

An ultraviolet exposure machine for producing latent images of microfilm records on duplicating film which may thereafter be developed. The machine includes a transparent drum having a diameter exceeding ten inches, the drum being floatably mounted within a cage of circumferentially spaced rollers. The major portion of the drum circumference is engaged by the inner section of a continuous conveyor belt which is under tension and which travels in an arcuate path, whereby movement of the belt causes the drum to rotate and to advance a microfilm record superposed over a duplicating film sandwiched between the belt and the periphery of the drum. The advancing film is uniformly exposed to ultraviolet rays emanating from a bulb mounted coaxially within the drum.

---

This invention relates generally to printing techniques for duplicating microfilm records, and more particularly to an ultraviolet exposure machine for producing latent images of microfilm records on duplicating film, which may thereafter be developed.

In order to conserve filing and storage space and to afford a ready means for retrieving information, widespread use is now made of microfilm on which the recorded data appears in a sharply reduced scale. To view the recorded data, the microfilm is placed on a reader or optical projector whereby an enlarged image is cast on a screen. The readability of the enlarged image depends on the definition or resolution of the microfilm being projected.

Modern documentation systems make use of microfilm records in either roll or unitized form. The roll form is constituted by a microfilm roll wherein each page or document to be recorded is photographed onto a separate frame of a continuous film web. Among the important unitized forms is a microfiche wherein microimages are arrayed serially along parallel rows in a grid formation on a transparent sheet, this being useful when one wishes to incorporate onto a single reproducible sheet interrelated documents or other information pertaining to a particular subject matter.

A preferred form of microfiche master which lends itself to low-cost duplication for making reference copies is disclosed in Patent 3,238,655. The present invention is applicable to all three forms of microfilm records, as well as to other forms requiring ultraviolet exposure.

The most effective way of making transparent duplicates of microfilm records, whether in roll, aperture card, microfiche or any other unitized form, is by the contact-printing process. In this process, a sensitive duplicating film is exposed in direct contact with the microfilm record. During exposure, light or ultraviolet radiation passes through the microfilm to the sensitive side of the duplicating film. Ordinarily, close contact at all points between the microfilm record and the duplicating film is essential if a sharp print is to be obtained. By the use of particular photosensitive films, one may obtain a direct positive or negative copy of the microfilm record.

There are two preferred forms of duplicating film which are particularly suitable for making copies of microfilm records. In one form, known commercially as Kalvar film, the emulsion contains crystallite particles which in their original crystallite state are completely transparent, the crystallites being mixed into an equally transparent resinous binder and being coated on a clear Mylar base. Upon exposure to ultraviolet light, the crystallites suspended in the plastic emulsion chemically change into nitrogen gas, thereby forming a latent image on the Kalvar film. To create the actual visual image, the emulsion is heated and thereby caused to soften, whereupon the high-pressure pockets of nitrogen expand, creating tiny bubbles which constitute the permanent image. Since the permanent image contains no silver or animal gelatins, the product is impervious to moisture, most alkalizers, and solvents. A more detailed description of Kalvar film and the processing thereof is to be found in the October 1965 article by Batchelder in "Systems—The Magazine of Paperwork Control," entitled "The Kalvar Story."

Another form of duplicating film which is extensively used for microfilm reproduction is known commercially as Diazo film. The film is an acetate or polyester base coated with a dye which when exposed to ultraviolet light has a latent image formed thereon which is thereafter developed by the use of ammonia fumes.

Thus whether Diazo or Kalvar film is used for duplicating, it is necessary in a contact-printing operation first to expose the duplicating film to ultraviolet light through the microfilm original or master to create a latent image.

The present invention is concerned only with an improved ultraviolet exposure machine for this purpose, and not with the subsequent step of development by heat or ammonia fumes. However, it will be appreciated that the machine disclosed herein may readily be combined or integrated with a developing stage to provide a self-contained printer.

One existing form of ultraviolet exposure machine makes use of a rotating cylindrical drum of transparent material, within which is disposed an ultraviolet lamp. The original microfilm and the unexposed duplicating film superposed thereover is caused to travel about the circumference of the drum by means of a conveyor belt which moves at the same linear speed as the drum and maintains the original and duplicating film in intimate contact with each other.

Rotary exposure machines of the type heretofore known make use of glass drums having a relatively small diameter, in the order of 4 to 8 inches. Experience has shown that such machines are slow and inefficient in operation, and in some instances produce duplicates of poor optical resolution. While the quality of the duplicates may be improved by the use of specially ground and highly polished glass drums, in conjunction with optical collimators for the ultraviolet source, such expedients add considerably to the cost of the exposure machine.

Accordingly, it is the main object of this invention to provide an ultraviolet exposure machine for contact-printing, which incorporates a drum of exceptionally large diameter, in the order of about 10 inches or greater, the drum being made of ordinary, low-cost glass and yet yielding results equal to or better than heretofore obtainable with more expensive and elaborate machines. It is possible with the invention to obtain acceptable results with large glass drums which lack proper concentricity and which incorporate minor imperfections.

As significant advantage of the invention resides in the fact that the total exposure path, which is determined by the drum circumference, is much longer than in prior devices, hence it is possible with standard ultraviolet lamps to obtain adequate exposure despite the increased radial distance between the lamp and the drum surface, while at the same time minimizing distortion because of the reduced lateral angle between the rays and the film surface, thereby producing copies of high resolution. On a production basis, the output of the machine depends on the drum movement in terms of linear feet per minute, and because of the extended exposure path, this may be made relatively fast with a resultant high output.

More specifically, it is an object of the invention to provide an exposure machine of the above-identified type wherein the enlarged glass drum is floatably mounted and is driven by a moving conveyor belt which engages the periphery thereof under tension and which acts to maintain a microfilm original and a duplicating film in intimate contact with each other in the course of their travel about the drum, the film being exposed by means of an ultraviolet lamp supported coaxially within the drum. Because of the floating arrangement, the interrelationship of the belt, the film combination and the drum is always maintained regardless of any eccentricity which may exist in the drum configuration.

It is also an object of the invention to provide in a machine of the above type, a conveyor-belt arrangement wherein a portion of the belt may be readily disengaged from the surface of the drum whereby the cleaning of the drum is facilitated without the need to remove the drum from the machine or otherwise dismantle components thereof. Since as a practical matter, one must clean the drum at least once a day to obtain copies of good quality, this feature is highly useful.

Yet another object of the invention is to provide an efficient cooling system adapted to direct air at high velocity onto the inner surface of the exposure drum to insure low drum temperatures for high-resolution printing.

A further object of the invention is to provide an ultraviolet source in combination with a simple optical wedge to effect substantially uniform exposure over the entire surface of the duplicating film.

Still another object of the invention is to provide a high-speed exposure machine which is efficient and reliable in operation and which may be manufactured at low cost.

Briefly stated, these objects are attained in an ultraviolet exposure machine wherein a transparent drum having a diameter in excess of ten inches is floatably mounted within a cage of circumferentially spaced rollers, the major portion of the drum circumference being engaged by the inner section of a continuous conveyor belt which is under tension and which travels in an arcuate path, whereby movement of the belt causes the drum to rotate and to advance a microfilm record superposed over a duplicating film sandwiched between the belt and the periphery of the drum. The advancing film is uniformly exposed to ultraviolet rays emanating from a bulb mounted coaxially within the drum and being partly masked by an optical wedge to compensate for uneven distribution of ultraviolet rays.

For a better understanding of the invention, as well as other objects and further features thereof, reference is made to the following detailed description to be read in conjunction with the accompanying drawings, wherein:

FIG. 1 is a front view in perspective of an ultraviolet exposure machine in accordance with the invention, the casing of the machine being partly removed to expose certain interior components;

FIG. 2 is a transverse section of the machine taken in the plane indicated by line 2—2 in FIG. 1;

FIG. 3 is a longitudinal section taken in the plane indicated by line 3—3 in FIG. 2;

FIG. 4 shows in perspective a detail of the machine indicating the manner in which the interior of the drum is air-cooled;

FIG. 7 diagrammatically illustrates one advantage of using a drum of large diameter.

Figure 5:
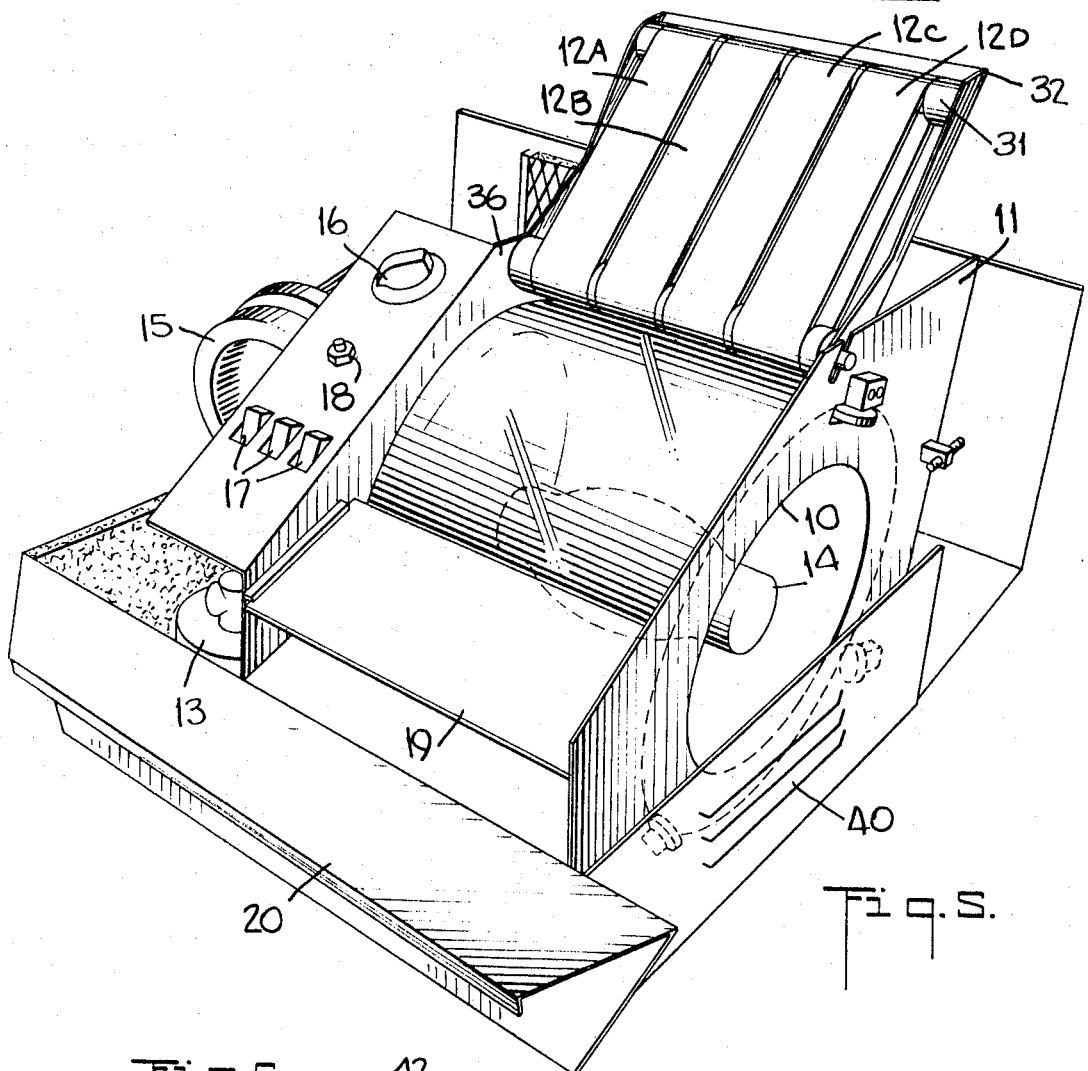
FIG. 5 is another perspective view of the machine, the drum being raised to facilitate cleaning.

Referring now to the drawings, and more particularly to FIGS. 1 and to 5, the main components of the exposure machine in accordance with the invention are a cylindrical drum 10 supported within a casing 11, the drum being rotated by a series of parallel continuous conveyor belts 12A, 12B, 12C and 12D, all of which are driven by a motor 13. Disposed coaxially within the drum is an ultraviolet lamp 14, the interior of the drum being cooled by means of a double-ended blower 15, having a pair of turbine blades. Casing 11 is provided with an inclined control panel on which is mounted a rheostat 16 for controlling motor speed, a group of switches 17 for obtaining different levels of ultraviolet intensity and a master electrical switch 18 for the entire circuit. Material to be duplicated is fed into the machine on a feed-in table 19, and is discharged from the machine onto the output table 20 at a rate determined by the speed of the drum in linear feet per minute.

Drum 10 is a tubular cylinder of glass, Pyrex or other transparent material having good optical properties, such as Lucite or Plexiglas. In practice, the drum may be formed of a low-cost extruded glass tube. To achieve acceptable results at minimum expense, the diameter of the drum must be in excess of ten inches, and is preferably at least twelve inches. As best seen in FIG. 2, drum 10 is floatably mounted in a cage of circumferentially spaced wheels 21, 22 and 23, preferably formed of Teflon. The drum is allowed a small degree of freedom so that only two wheels engage the drum surface at any one time to allow for any lack of concentricity in the drum. It is not essential, therefore, that the surface of the drum be ground to remove eccentricity. Endwise movement of the drum is restricted by wheels 24 and 25, as shown in FIG. 3.

The continuous belts 12A, 12B, 12C and 12D, which may be of a neoprene or textile composition, are supported on rollers 26, 27, 28, 29, 30 and 31, the belts encompassing the major portion of the drum to define an access opening into which the feed-in table 19 is inserted. The inner sections of the belts assume an arcuate path to engage the periphery of the drum, the intermediate rollers 27, 28, 29 and 30 engaging only the outer sections of the belts. Roller 27 is operatively coupled to motor 13, thereby moving the belts simultaneously and causing the drum to turn at a rate controlled by the motor speed. To insure good contact between the belts and the drum and to prevent slippage, roller 29 is spring-biased to maintain the belts under tension at all times, so that the inner sections thereof press against the surface of the drum and hold the microfilm and duplicating film in intimate contact with each other.

It is necessary to clean the surface of the drum at frequent intervals, and to this end a casing door 32 is provided. Intermediate roller 30, as best seen in FIGS. 2 and 5, acts as the hinge for the door and is rotatably supported at its end axles in slots formed in casing 11, whereas end roller 31 is supported in suitable bearings secured to the door. Thus when the door is raised, end roller 31 and the belt portions running thereon are also raised, thereby giving access to the surface of the drum for purposes of cleaning. To restore the machine to working order, one has merely to lower the door, causing the belts to again engage the drum surface.

Ultraviolet lamp 14 is a high-pressure mercury vapor lamp which in practice may be a 400-watt lamp. By means of switches 17, lamp power may be reduced to 200 and 300 watt levels to lower the degree of exposure, as desired. Since the rays emanating from the central portion of the lamp tend to be of greater intensity than those emitted toward the end of the lamp, an optical wedge 33 is fixedly mounted within the drum, the wedge being curved to conform to the curvature of the inner surface of the drum and being tapered to reduce the amount of rays striking the central area of the drum to a degree compensating for the greater emission from the lamp in the corresponding lamp area. In this way, the exposure of the material being conveyed along the drum is made uniform despite the lack of uniformity in the emission characteristics of the lamp.

A pair of deflecting baffles 34 and 35 is provided at diametrically opposing sides of the lamp 14 adjacent the inner partition 36 which separates the drum compartment from the compartment containing blower 15. It will be noted that the socket 14a for the lamp is disposed in the blower compartment (FIG. 3). Blower 15 is a double-ended fan, one fan blowing air through duct 37 into the drum compartment, and the other, through duct 38. The air blown through these ducts impinges on deflecting baffles 34 and 35, and is thereby directed onto the inner surface of drum 10 to cool same, as shown in FIG. 4.

Cool air enters the blower compartment through a filter 39 in the side of the casing, the filter being designed to extract dust particles from the incoming air. The heated air from the drum compartment is discharged through side louvres 40 in the casing.

Figure 6:
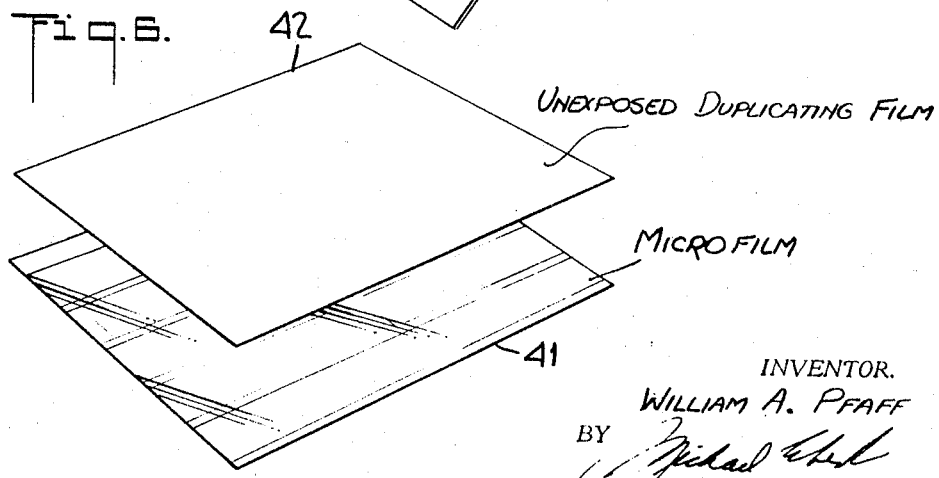
FIG. 6 illustrates the relationship of a typical microfiche master and a duplicating film for use in the machine.

In operation, a duplicating film 42, which may be of the Kalvar or Diazo type, is placed over a microfiche original, such as item 41 in FIG. 6, the combination being inserted into the machine as shown by the input arrow in FIG. 2, with the microfiche disposed against the drum and the film against the belts. The combination is caused by the belts to travel along a circumferential path, during which time the film is irradiated with ultraviolet light to form a latent image thereon of the microfiche subject matter. The exposed combination is then discharged onto table 20.

The identical procedure can be used with aperture cards or other unitized microfilm records, but in the case of microfilm rolls, the strips may be run continuously through the machine. While the machine may be fed manually, it will be appreciated that automatic feeders may also be used in large-scale operations. It is also possible to combine an automatic feeder, an exposure unit and a developer into an integrated system.

The significance of drum size will be explained in connection with FIG. 7. In contact-printing, for good resolution it is important that the rays of light penetrating the original and impinging on the duplicating film, extend perpendicularly to the plane of these items. In this way, the latent impressions on the film will exactly match the image components on the original, point by point. On the other hand, there may be a small spacing between the image components on the original and the plane of the duplicating film, for in practice, some spacing is unavoidable even when the two items are pressed intimately against each other without any intermediate layer. In this event, should the light strike the film combination at an angle rather than normal thereto, the latent image no longer corresponds to the image components but is somewhat diffused. The greater the angle of incidence of the rays, the more pronounced the loss of definition.

If we now assume, as shown in FIG. 7, that lamp $L_1$ is a point source and is only two inches from the film combination, and that the combination is several inches wider in the dimension at right angles to the direction of movement, the rays impinging on the combination will only be normal thereto at the center and then increase in angularity, so that the rays striking the edges of the combination will have a relatively sharp angle with a resultant high degree of distortion. A two-inch separation between lamp and film would be characteristic of a four-inch diameter drum. The reason the films are planar in FIG. 7 is that the showing is perpendicular to the curved path of movement and hence is taken across the film.

But if we now have a six-inch separation, as is obtainable with a twelve-inch diameter drum in accordance with the invention, it will be seen that the angle of the rays does not depart sharply from normal, even at the very edges of the film combination. Thus it becomes feasible to use a naked bulb without special optical expedients to collimate the rays.

With a large-diameter drum of, say, twelve inches, the circumference is about 36 inches, and the travel path taken by the film combination is about 33 inches in length. This length is far greater than is obtainable with drums of four to eight inches. Hence it becomes possible to run the film combination at relatively high speed and yet obtain adequate exposure because of the protracted exposure path. Since film combinations are fed into the machine in direct sequence, the productivity of the machine depends on the speed of the drum in linear feet per minute, not on the amount of time it takes an individual combination to be fully exposed. Hence with the large drum, the output is exceptionally high as compared to prior devices. Because of the advantages which flow from the use of large drums, it is possible to use glass having impurities or minor imperfections and yet obtain acceptable results.

In some instances, a glass drum may not be acceptable, for should the glass contain a large number of occlusions in the form of bubbles or seeds, or should the glass have striations, these imperfections may degrade the quality of the latent images below acceptable standards. Should a plastic material then be used in place of glass, while the plastic material may initially be free of imperfections, in time scratches may develop. To protect the plastic drum, it may therefore be desirable to cover the drum surface with a removable skin of polyethylene terephthalate material in film form (Mylar). Such films are highly transparent and have exceptional physical properties. But should the film become scratched or otherwise marred, it can readily be replaced. Alternatively, the film may be directly coated on the drum rather than adhered thereto, and for this purpose a polyester coating solution may be used, of the type disclosed in Patent 2,965,613.

While there has been shown and described a preferred embodiment of ultraviolet exposure machine in accordance with the invention, it will be appreciated that many changes and modifications may be made therein without, however, departing from the essential spirit of the invention as defined in the annexed claims.

What I claim is:
1. An ultraviolet exposure machine for forming latent images of microfilm on a duplicating film, said machine comprising:
   (a) a transparent drum, having a diameter of at least ten inches and possibly lacking concentricity,
   (b) an ultraviolet lamp coaxially mounted within said drum,
   (c) means floatably to mount said drum, said means being constituted by a cage of circumferentially spaced wheels only two of which engage the surface of the drum at any one time to allow for any lack of concentricity therein,
   (d) a continuous conveyor belt having an inner arcuate section engaging the major portion of the circumference of the drum, the remaining portion constituting an opening into which a microfilm and duplicating film combination may be introduced between said belt and drum,
   (e) means to tension said belt to press said combination between said belt and said drum, and
   (f) motor means to move said belt and thereby rotate said drum, whereby the combination is caused to travel about said drum.

2. A machine as set forth in claim 1, further including an optical wedge mounted within said drum to correct for nonuniform emission from said lamp.

3. A machine as set forth in claim 1, wherein said drum has a diameter of about twelve inches.

4. A machine as set forth in claim 1, wherein said drum is mounted in a compartment having a door, said belt being mounted on rollers, one of which serves as a hinge for said door, the other being rotatably mounted on said door, whereby when the door is opened, said belt is partially lifted from the drum to facilitate cleaning thereof.

5. A machine as set forth in claim 1, further including means to blow air at high velocity into said drum and to direct it onto the interior surface of the drum.

6. A machine as set forth in claim 1, wherein said drum is formed of an extruded glass tube.

7. A machine as set forth in claim 1, wherein said drum is formed of transparent plastic material.

8. A machine as set forth in claim 7, wherein said drum has a removable transparent skin thereover.

References Cited

UNITED STATES PATENTS

| | | | |
|---|---|---|---|
| 3,157,102 | 11/1964 | Pfaff | 95—75 |
| 3,224,354 | 12/1965 | Dietzgen et al. | 95—77.5 |
| 3,224,355 | 12/1965 | Thomiszer | 95—77.5 |

RALPH G. NILSON, *Primary Examiner.*

A. L. BIRCH, *Assistant Examiner.*

U.S. Cl. X.R.

250—65